(12) United States Patent
Santangelo et al.

(10) Patent No.: US 12,536,216 B2
(45) Date of Patent: Jan. 27, 2026

(54) PREDICTION OF TRANSFORMATIVE BREAKTHROUGHS IN RESEARCH

(71) Applicant: The United States of America, as represented by the Secretary, Department of Health and Human Services, Bethesda, MD (US)

(72) Inventors: George M. Santangelo, Washington, DC (US); Matthew T. Davis, Clarksburg, MD (US); Bruce I. Hutchins, Sun Prairie, WI (US); Brad L. Busse, Kensington, MD (US)

(73) Assignee: The United States of America, as represented by the Secretary Department of Health and Human Services, Bethesda, MD (US)

( * ) Notice: Subject to any disclaimer, the term of this patent is extended or adjusted under 35 U.S.C. 154(b) by 0 days.

(21) Appl. No.: 18/703,175

(22) PCT Filed: Oct. 19, 2022

(86) PCT No.: PCT/US2022/047099
§ 371 (c)(1),
(2) Date: Apr. 19, 2024

(87) PCT Pub. No.: WO2023/069493
PCT Pub. Date: Apr. 27, 2023

(65) Prior Publication Data
US 2025/0225168 A1    Jul. 10, 2025

Related U.S. Application Data

(60) Provisional application No. 63/257,818, filed on Oct. 20, 2021.

(51) Int. Cl.
G06F 16/38 (2019.01)
G06F 16/35 (2025.01)
G06F 40/205 (2020.01)

(52) U.S. Cl.
CPC ............ *G06F 16/382* (2019.01); *G06F 16/35* (2019.01); *G06F 40/205* (2020.01)

(58) Field of Classification Search
CPC ....... G06F 16/382; G06F 16/35; G06F 40/205
See application file for complete search history.

(56) References Cited

U.S. PATENT DOCUMENTS 6,457,028 B1 * 9/2002 Pitkow .................... G06F 16/30
707/999.005
6,853,952 B2   2/2005 Chadwick
(Continued)

FOREIGN PATENT DOCUMENTS

CN    107220320 B    9/2017
CN    108509481 A    9/2018

OTHER PUBLICATIONS

European Patent Office, International Search Report and Written Opinion issued in connection with PCT/US2022/047099, mailed Feb. 1, 2023, 9 pages.
(Continued)

*Primary Examiner* — William P Bartlett
(74) *Attorney, Agent, or Firm* — Leydig, Voit & Mayer, Ltd.

(57) ABSTRACT

A system, method and non-transitory computer readable medium for organizing scientific and technological publication data for performing predictive analysis is provided. According to embodiments of this disclosure, organizing scientific and technological publication data for performing predictive analysis includes: receiving the publication data from a publication database; parsing the publication data to obtain citations and associated citation data for each publi-
(Continued)

cation; storing the citation data in a first database; identifying one or more co-citations between publications in the citation data to obtain co-citation information between publications; and storing the co-citation information between publications in a second database.

14 Claims, 4 Drawing Sheets

(56) References Cited

U.S. PATENT DOCUMENTS

| | | | | |
|---|---|---|---|---|
| 8,612,411 | B1* | 12/2013 | Mittal | G06F 16/355 707/750 |
| 8,935,291 | B2 | 1/2015 | Chen | |
| 9,836,183 | B1 | 12/2017 | Love et al. | |
| 10,878,016 | B2 | 12/2020 | Eckardt et al. | |
| 11,062,218 | B2 | 7/2021 | Aravamudan et al. | |
| 11,182,679 | B2 | 11/2021 | Buchanan et al. | |
| 2007/0239704 | A1* | 10/2007 | Burns | G06F 16/951 707/999.005 |
| 2016/0132787 | A1 | 5/2016 | Drevo et al. | |
| 2016/0335257 | A1 | 11/2016 | Janssens | |
| 2017/0076219 | A1* | 3/2017 | Byrnes | G06F 16/93 |
| 2019/0213221 | A1* | 7/2019 | Zholudev | H04L 67/1044 |
| 2020/0090100 | A1* | 3/2020 | Fu | G06Q 10/0635 |
| 2021/0073251 | A1 | 3/2021 | Eckardt et al. | |
| 2022/0076165 | A1 | 3/2022 | Minkin et al. | |

OTHER PUBLICATIONS

Hutchins et al., "Predicting translational progress in biomedical research," *PLoS Biology*, 17, e3000416, doi:10.1371/journal.pbio.3000416 (2019).

Shannon et al., "A Mathematical Theory of Communication," *The Bell System Technical Journal*, vol. 27: 379-423, 623-656 (1948).

* cited by examiner

PREDICTION OF TRANSFORMATIVE BREAKTHROUGHS IN RESEARCH

CROSS-REFERENCE TO RELATED APPLICATIONS

This patent application is the U.S. national stage of International Application No. PCT/US2022/047099, filed Oct. 19, 2022, which claims the benefit of U.S. Provisional Patent Application No. 63/257,818, filed Oct. 20, 2021, each of which is incorporated by reference in its entirety herein.

STATEMENT REGARDING FEDERALLY SPONSORED RESEARCH OR DEVELOPMENT

This invention was made with Government support by the National Institutes of Health. The Government has certain rights in the invention.

BACKGROUND OF THE INVENTION

The ability to predict scientific breakthroughs at scale would accelerate the pace of discovery and dramatically improve the efficiency of research investment. Scientific advancements occur when specific insights or ideas survive rigorous testing of their validity. Although scientists have many ideas, only a few give rise to a transformative breakthrough. For instance, these few transformative breakthroughs result in direct benefits, such as a new medicine or therapy, or indirect benefits, such as a new research discipline or method that catalyzes further breakthroughs.

The time, effort, and resources required to convert an idea to practice are generally recognized as rate-limiting factors in advancing scientific knowledge. An equally important but less well appreciated barrier is the speed with which transformative ideas are recognized. Delays in recognizing breakthroughs in biomedicine are not uncommon. As such, scientists, research funders, investors, and other such individuals, would therefore benefit from a systematic way to identify research topics that are likely to produce transformative breakthroughs.

Given the exponential growth of scientific literature, human curation of research articles is an increasingly inefficient way to detect trailblazing discoveries. Computational approaches are now commonly used to supplement manual curation. Accurate mapping of transformative events at scale, however, is a daunting "needle in the haystack" challenge. Evidence of the occurrence of a breakthrough must be mined from one or more databases of varying size and complexity, and publications within those databases that report major breakthroughs are rare. Therefore, of the vast array of distinct scientific topics studied by scientists, only a few produce discoveries that attain true breakthrough status.

BRIEF SUMMARY OF THE INVENTION

In accordance with an embodiment of the disclosure, a system for organizing scientific and technological publication data for performing predictive analysis is provided. The system comprises: a processor; and a memory storing instructions that, when executed by the processor, configure the system to perform steps comprising: receiving the publication data from a publication database; parsing the publication data to obtain citations and associated citation data for each publication; storing the citation data in a first database; identifying co-citation between publications in the citation data; and storing the co-citation information between publications in a second database.

In certain embodiments, the memory of the system stores further instructions that when executed by the processor configure the system to perform steps further comprising: projecting a historical view of the co-citation information between publications in the second database to obtain historical co-citation information; computing a co-citation vector for each publication from the historical co-citation information to obtain vector data structures describing a number of times a publication is co-cited together with another publication as a value of a component of the vector data structure; performing a first order cosine similarity calculation on the vector data structures to obtain cosine similarity data for publications that are co-cited together; comparing the cosine similarity data against a similarity threshold, wherein cosine similarity data greater than the similarity threshold is used to create a co-citation graph and retained as input to a Regularized Markov Cluster (RMCL) algorithm configured to perform RMCL parsing; applying the RMCL algorithm to the co-citation graph defined by edges that surpass the similarity threshold to determine/map high betweenness edges that parse the co-citation graph into separate topic clusters; and collecting the features of the topic clusters, including unique identifiers of publications included in each topic cluster.

In further embodiments, the co-citation network is based on application of the RMCL algorithm to the co-citation graph to create topic clusters that include publications and citations through a latest year selected for inclusion of publication and citation data that is defined as a year of the topic cluster. The memory of the system stores further instructions that when executed by the processor configure the system to perform steps further comprising: identifying for each topic cluster of year x, two additional topic clusters, one from topic cluster year x−1, and one from topic cluster year x+1, based on a highest percentage of overlapping publications between the year x and the year x−1, and separately between the year x and the year x+1, across all publication years within each of those topic clusters; and assembling those overlapping topic clusters into chronological trajectories based upon the connections established between each topic cluster in the year x and each corresponding topic cluster, in years x−1 and x+1.

Additionally, in certain embodiments, the memory of the system stores further instructions that when executed by the processor configure the system to perform steps further comprising: enriching the trajectory of topic clusters arranged over time with historical Relative Citation Ratios (RCRs) and Approximate Potential to Translate (APT) scores.

In further embodiments, the memory of the system stores further instructions that when executed by the processor configure the system to perform steps further comprising: enriching the topic cluster from the individual year with historical cluster data including factors predictive of a technological breakthrough; applying a logistic regression model with respect to the factors predictive of the technological breakthrough; and predicting whether each topic cluster identified by the RMCL parsing of the full co-citation network is likely to produce a scientific or technological breakthrough.

In certain embodiments, the factors predictive of the technological breakthrough comprise: a % New factor indicating a percentage of all publications within each topic cluster that appeared no earlier than one year prior to the year x of that topic cluster; an ancestral % New factor indicating a percentage of all publications in topic cluster x−1 that appeared no earlier than one year prior to the year x−1 of that topic cluster; a normalized entropy factor providing a distribution of publications within the topic cluster relative to a collection of control topic clusters with a similar number of publications; and an occurrence of highly influential publications within the topic cluster, as measured by historical Relative Citation Ratio (RCR) values.

In further embodiments, the occurrence of highly influential publications within the topic cluster is determined based on historical RCRs and Approximate Potential to Translate (APT) scores.

The disclosure further provides a method for organizing publication data for performing predictive analysis, the method comprising: receiving the publication data from a publication database; parsing the publication data to obtain citations and associated citation data for each publication; storing the citation data in a first database; identifying co-citation between publications in the citation data; and storing the co-citation information between publications in a second database.

In certain embodiments, the method for organizing publication data for performing predictive analysis further includes: projecting a historical view of the co-citation information between publications in the second database to obtain historical co-citation information; computing a co-citation vector for each publication from the historical co-citation information to obtain vector data structures describing a number of times a publication is co-cited together with another publication as a value of a component of the vector data structure; performing a first order cosine similarity calculation on the vector data structures to obtain cosine similarity data for publications that are co-cited together; comparing the cosine similarity data against a similarity threshold, wherein cosine similarity data greater than the similarity threshold is retained as input to a Regularized Markov Cluster (RMCL) algorithm configured to perform RMCL parsing; applying the RMCL algorithm to a co-citation graph defined by edges that surpass the similarity threshold to determine/map high betweenness edges that parse the co-citation information into separate topic clusters; and collecting features of the topic clusters, including unique identifiers of the publications included in each topic cluster.

In further embodiments, the co-citation network is based on publications from an individual year, and the method further includes: identifying, for each topic cluster of year x, two additional topic clusters, one from topic cluster year x−1, and one from topic cluster year x+1, based on a highest percentage of overlapping publications between the year x and the year x−1, and separately between the year x and the year x+1, across all publication years within each of those topic clusters; and assembling the overlapping topic clusters into chronological trajectories based upon connections established between each topic cluster in the year x and each corresponding topic cluster in the year x−1 and the year x+1.

In certain embodiments, the method for organizing publication data for performing predictive analysis further includes enriching the trajectory of topic clusters arranged over time with historical Relative Citation Ratios (RCRs) and Approximate Potential to Translate (APT) scores.

In further embodiments, the method for organizing publication data for performing predictive analysis further includes: enriching the topic cluster from the individual year with historical cluster data including factors predictive of a technological breakthrough; applying a logistic regression model with respect to the factors predictive of the technological breakthrough; and predicting whether each topic cluster identified by the RMCL parsing of the full co-citation network is likely to produce a scientific or technological breakthrough.

In certain embodiments, the factors predictive of the technological breakthrough comprise: a % New factor indicating a percentage of all publications within each topic cluster that appeared no earlier than one year prior to year x of that topic cluster; an ancestral % New factor indicating a percentage of all publications in topic cluster x−1 that appeared no earlier than one year prior to year x−1 of that topic cluster; a normalized entropy factor providing a distribution of publications within the topic cluster relative to a collection of control topic clusters with a similar number of publications; and an occurrence of highly influential publications within the topic cluster, as measured by historical Relative Citation Ratio (RCR) values.

In further embodiments, the occurrence of highly influential publications within the topic cluster is determined based on historical RCRs and Approximate Potential to Translate (APT) scores.

The disclosure further yet provides a non-transitory computer readable medium storing instructions for organizing technical publication data for performing predictive analysis, wherein when a computer executes the instructions, the computer is configured to perform steps comprising: receiving the publication data from a publication database; parsing the publication data to obtain citations and associated citation data for each publication; storing the citation data in a first database; identifying co-citations between publications in the citation data to obtain co-citation information between publications; and storing the co-citation information between publications in a second database.

In certain embodiments, the instructions cause the computer to perform steps further comprising: projecting a historical view of the co-citation information between publications in the second database to obtain historical co-citation information; computing a co-citation vector for each publication from the historical co-citation information to obtain vector data structures describing a number of times a publication is co-cited together with another publication as a value of a component of the vector data structure; performing a first order cosine similarity on the vector data structures to obtain cosine similarity data; comparing the cosine similarity data against a similarity threshold, wherein cosine similarity data greater than the similarity threshold is retained as input to a Regularized Markov Cluster (RMCL) algorithm configured to perform RMCL parsing; applying the RMCL algorithm to the citation graph defined by edges that surpass the similarity threshold to determine/map high betweenness edges between a topic cluster and other topic clusters; and collecting features of the topic cluster, including unique identifiers of the publications included in each topic cluster.

In further embodiments, the co-citation network is based on publications from an individual year, and the instructions cause the computer to perform steps further comprising: identifying, for each topic cluster of year x, two additional topic clusters, one from topic cluster year x−1, and one from topic cluster year x+1, based on a highest percentage of overlapping publications between the year x and the year x−1, and separately between the year x and the year x+1, across all publication years within each of those topic clusters; and assembling the overlapping topic clusters into chronological trajectories based upon connections established between each topic cluster in the year x and each corresponding topic cluster in the year x−1 and the year x+1.

In certain embodiments, the instructions cause the computer to perform steps further comprising: enriching the trajectory of topic clusters arranged over time with historical Relative Citation Ratios (RCRs) and Approximate Potential to Translate (APT) scores.

In further embodiments, the instructions cause the computer to perform steps further comprising: enriching the topic cluster from the individual year with historical cluster data including factors predictive of a technological breakthrough; applying a logistic regression model with respect to the factors predictive of the technological breakthrough; and predicting whether each topic cluster identified by the RMCL parsing of the full co-citation network is likely to produce a scientific or technological breakthrough.

In certain embodiments, the factors predictive of the technological breakthrough comprise: a % New factor indicating a percentage of all publications within each topic cluster that appeared no earlier than one year prior to year x of that topic cluster; an ancestral % New factor indicating a percentage of all publications in topic cluster x−1 that appeared no earlier than one year prior to year x−1 of that topic cluster; a normalized entropy factor providing a distribution of publications within the topic cluster relative to a collection of control topic clusters with a similar number of publications; and an occurrence of highly influential publications within the topic cluster, as measured by historical Relative Citation Ratio (RCR) values.

In further embodiments, the occurrence of highly influential publications within the topic cluster is determined based on historical RCRs and Approximate Potential to Translate (APT) scores.

BRIEF DESCRIPTION OF THE SEVERAL VIEWS OF THE DRAWING(S)

FIG. 1 provides a functional block diagram of a system for performing a method of organizing scientific and technological publication data to map the trajectories of scientific topics as they develop over time, and identify signals of scientific and technological breakthroughs, in accordance with embodiments of the disclosure;

DETAILED DESCRIPTION OF THE INVENTION

Figure 1:
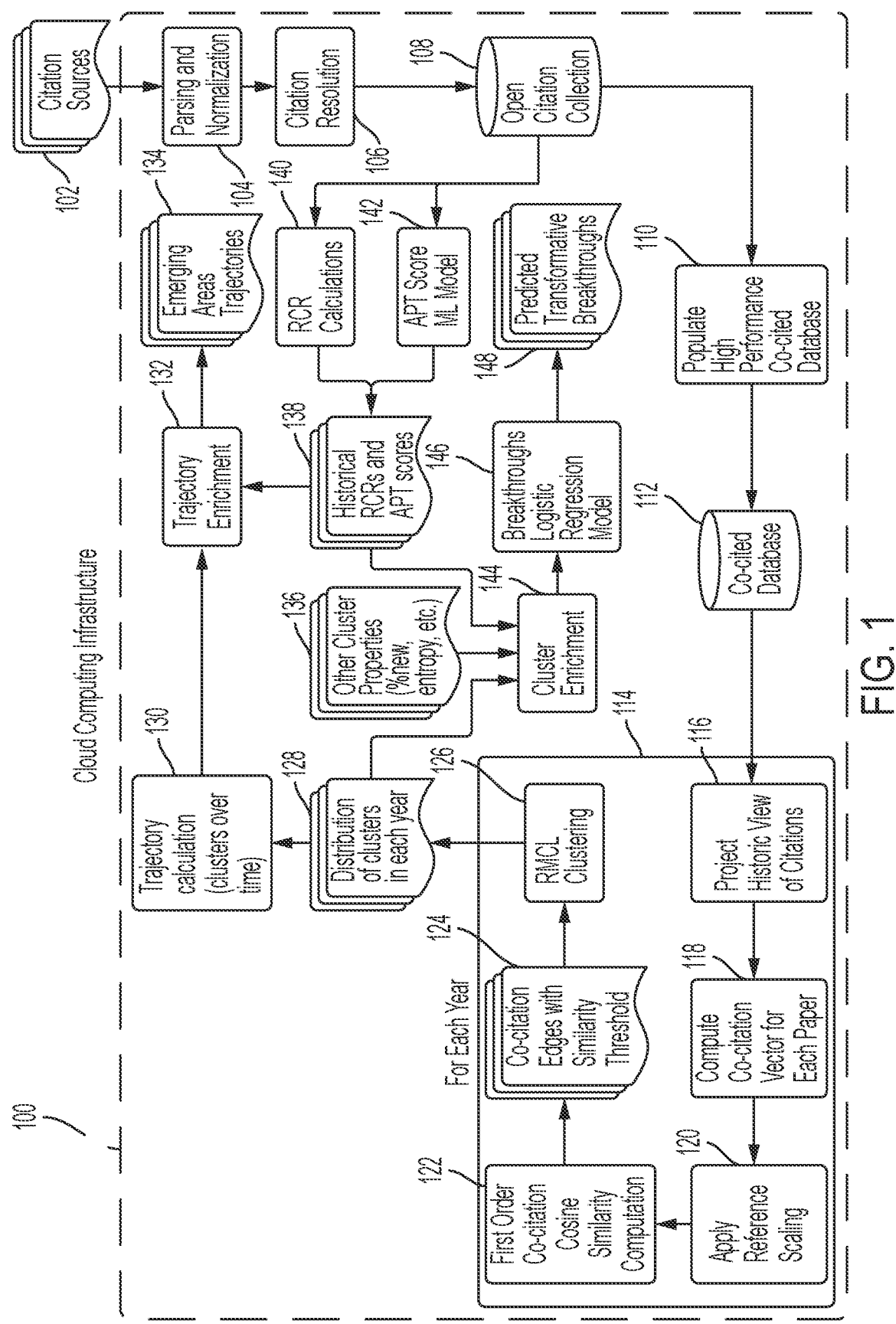

As discussed above, the size of scientific and technological publication databases grows every year, and, in order to detect signals indicative of a breakthrough, there is a need for the ability to quantify and track the aggregate features of publications in those databases. FIG. 1 illustrates a functional block diagram of a system 100 for performing a method of organizing scientific and technological publication data to determine emerging trajectories and identify signals of breakthroughs. The system 100 detects rare signals in scientific publications within one or more database (s), 102 identifying which topics will produce transformative discoveries in future years. Specifically, the system 100 manipulates and categorizes data taken from publications stored in the databases 102 to represent scientific topics as trajectories 134 and separately to identify predicted transformative breakthroughs 148. In this manner, signals indicative of a technological breakthrough may be present and detectable ten or more years in advance of the breakthrough.

Initially, system 100, at blocks 104-112 converts information in scientific publications from databases 102 into a structured set of features amenable to high-throughput computational analysis. In general, this conversion may be accomplished by linking publications through each publication's list of cited references to create a network of citations. In the illustrated embodiment, publications from databases 102 are parsed and normalized at block 104 to compile citations for each publication into a normalized data structure for further analysis by system 100.

At block 106, the normalized citations are resolved to link them to their publication in a related and categorical manner. The normalized and resolved citations are then stored in an open citation collection database 108, which in turn provides the normalized and resolved citations to block 110 for determining co-citation information. The block 110 collects publications with related co-citations and populates information for those publications in a co-citation database 112.

Figure 2:
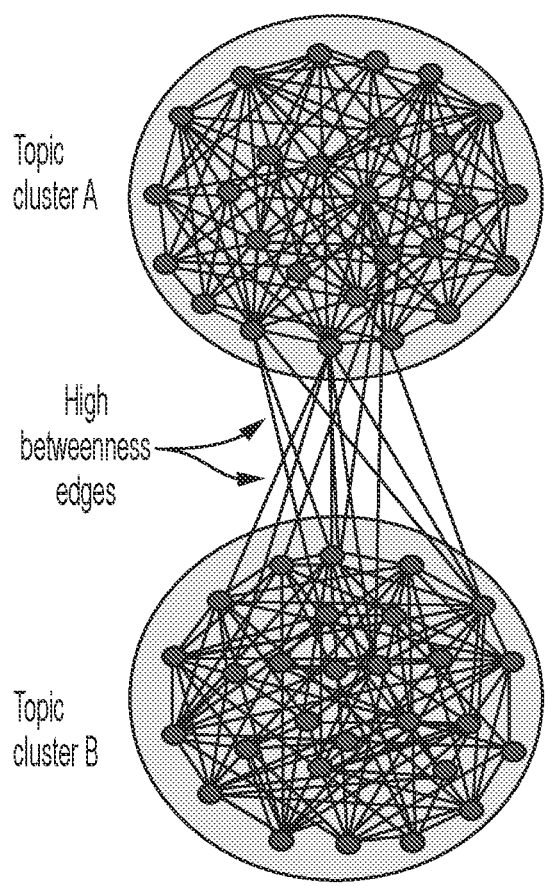
FIG. 2 illustrates a co-citation network, in accordance with embodiments of the disclosure.

System 100 creates co-citation networks (CCNs) from information stored within the co-cited database 112 at super-block 114 containing sub-blocks 116-126. FIG. 2 illustrates an exemplary view of a CCN between two topic clusters A and B. As illustrated, individual publications are represented as nodes within a topic cluster, where each cluster contains a collection of related publications. Lines (from here on the lines will be referred to as edges) are drawn between the publications within the cluster to represent the relatedness of the publications based on co-citations. In this manner, publications are grouped into related topic clusters. Additionally, edges are present between the topic clusters, which represent closely related but distinct publications that are connected by edges with high betweenness centrality (i.e., the edges that represent the shortest path between two nodes represent the most robust measure of centrality or relatedness between topics in a CCN).

Returning to FIG. 1 and the creation of a CCN, super block 114 contains sub-blocks 116-126 in the creation of the above described CCNs. Block 116 projects a historical view of citations from the co-citated database 112. In certain embodiments, this arranges the citations of each publication in a historical sense. The historically arranged data is provided to block 118 for computing a co-citation vector for each publication. This creates a vector data structure with the number of times a publication is co-cited together with another publication as a value of a component of the vector data structure.

At block 120, reference scaling is performed on the vector data for each publication resulting in a scaled collection of vector data. Following this reference scaling, at block 122, a first order co-citation cosine similarity computation is performed between each vector of the scaled collection of vector data. The cosine similarity data is provided to block 124, which applies a similarity threshold to the cosine similarity data in order to determine a similarity between publications. In this manner, edges are created between publications, and publications are clustered into topic clusters as illustrated in FIG. 2. In an exemplary embodiment, the similarity threshold may be 0.35. However, the similarity threshold can be varied based on a level of similarity desired between the publications in the topic cluster.

Once the topic clusters are formed by applying the similarity threshold at block 124, betweenness (i.e., relatedness between the topic clusters) is determined at block 126. Block 126 applies a Regularized Markov Cluster (RMCL) algorithm to achieve RMCL clustering. In this manner, betweenness edges are determined between topic clusters. With the addition of betweenness edge data, a CCN as illustrated in FIG. 2 is created. In the above exemplary embodiment where the similarity threshold is 0.35, after application of the RMCL algorithm, each cluster remains connected to a median of five other clusters. Accordingly, the relatedness of publications within clusters and between clusters is affected based on the similarity threshold.

As illustrated, super block 114 creates these CCNs for the co-cited database 112 for each year of data within the database. All of the CCN data is provided to block 128 for organizing the CCN data based on cluster year. Using this data organized by cluster year, system 100 is able to determine areas of emerging trajectories at blocks 130-134 and predict transformative breakthroughs at blocks 144-148.

The system 100 determines areas of emerging trajectories at blocks 130-134. At block 130, system 100 performs a trajectory calculation to create a view of clusters arranged over time based on the CCN data, which are organized in accordance with each historical CCN year. This calculation is performed by matching each cluster to its counterpart in each available historical CCN and connects them in series such that each cluster from the network of year x is linked to its counterparts in years x−1 and x+1. Block 130 accomplishes this by finding clusters in years x−1 and x+1 with a highest percentage of overlapping PubMed Identifiers (PMIDs), where each PMID is a unique identifier that references one and only one publication. To find these clusters in years x−1 and x+1 with a highest percentage of overlapping PMIDs, block 130 applies the following binary measures:

| Descriptor | Temporal direction | Definition |
|---|---|---|
| has_host | Forward | Is there a cluster in year x + 1 (i.e., the next cluster year) that contains over 50% of these PMIDs? |
| comprises_host | Forward | Do PMIDs from the year x (i.e., the reference year's) cluster comprise over 50% of the identified cluster (cluster with largest # of this year's PMIDs)? |
| comprises_host_alt | Forward | Do PMIDs from the year x cluster comprise over 50% of the identified cluster (cluster with second-largest number of this year's PMIDs)? |
| has_ancestor | Backward | Is there a cluster from year x − 1 (i.e., the previous year) that contains over 50% of these PMIDs? |
| comprises_ancestor | Backward | Do PMIDs from the year x cluster comprise over 50% of the identified cluster (cluster with largest # of this year's PMIDs)? |
| comprises_ancestor_alt | Backward | Do PMIDs from the year x cluster comprise over 50% of the identified cluster (cluster with second-largest # of this year's PMIDs)? |

The trajectory calculation of block 130 then categorizes links between the clusters from one year to the next. The categorization is labeled as a "major" or "minor" link. A "major" link indicates closest matches between clusters from year to year, and a "minor" link indicates related clusters from year to year with lower but still significant matches. The following table categorizes links between clusters from year to year:

| Link description | Temporal direction | Link type | Criteria |
|---|---|---|---|
| 1-to-1 | Forward | Major link | has_host AND comprises_host |
| Captured | Forward | Minor link | has_host AND (NOT comprises_host) |
| Split | Forward | Major link | (NOT has_host) AND comprises_host AND comprises_host_alt |
| Shed | Forward | Major link | (NOT has_host) AND (comprises_host) OR (comprises_host_alt) |
| Disintegrate | Forward | No link | NOT (has_host OR comprises_host OR comprises_host_alt) |
| Bud | Forward | Minor link | has_host AND comprises_host AND comprises_host_alt [this link is made for the next year's cluster with the second largest number of overlapping PMIDs] |
| 1-to-1 | Backward | Major link | has_ancestor AND comprises_ancestor |
| Split (recombination) | Backward | Minor link | has_ancestor AND (NOT comprises_ancestor) AND comprises_ancestor_alt |
| Split (clean) | Backward | Minor link | has_ancestor AND (NOT comprises_ancestor) AND (NOT comprises_ancestor_alt) |
| Merger (two) | Backward | Major link | (NOT has_ancestor) AND comprises_ancestor AND comprises_ancestor_alt |
| Merger (lots) | Backward | Major link | (NOT has_ancestor) AND comprises_ancestor AND (NOT comprises_ancestor_alt) |
| Minor merger | Backward | Minor link | (NOT has_ancestor) AND (NOT comprises_ancestor) AND comprises_ancestor_alt |
| De novo formation | Backward | No link | NOT (has_ancestor OR comprises_ancestor OR comprises_ancestor_alt) |

Figure 3:
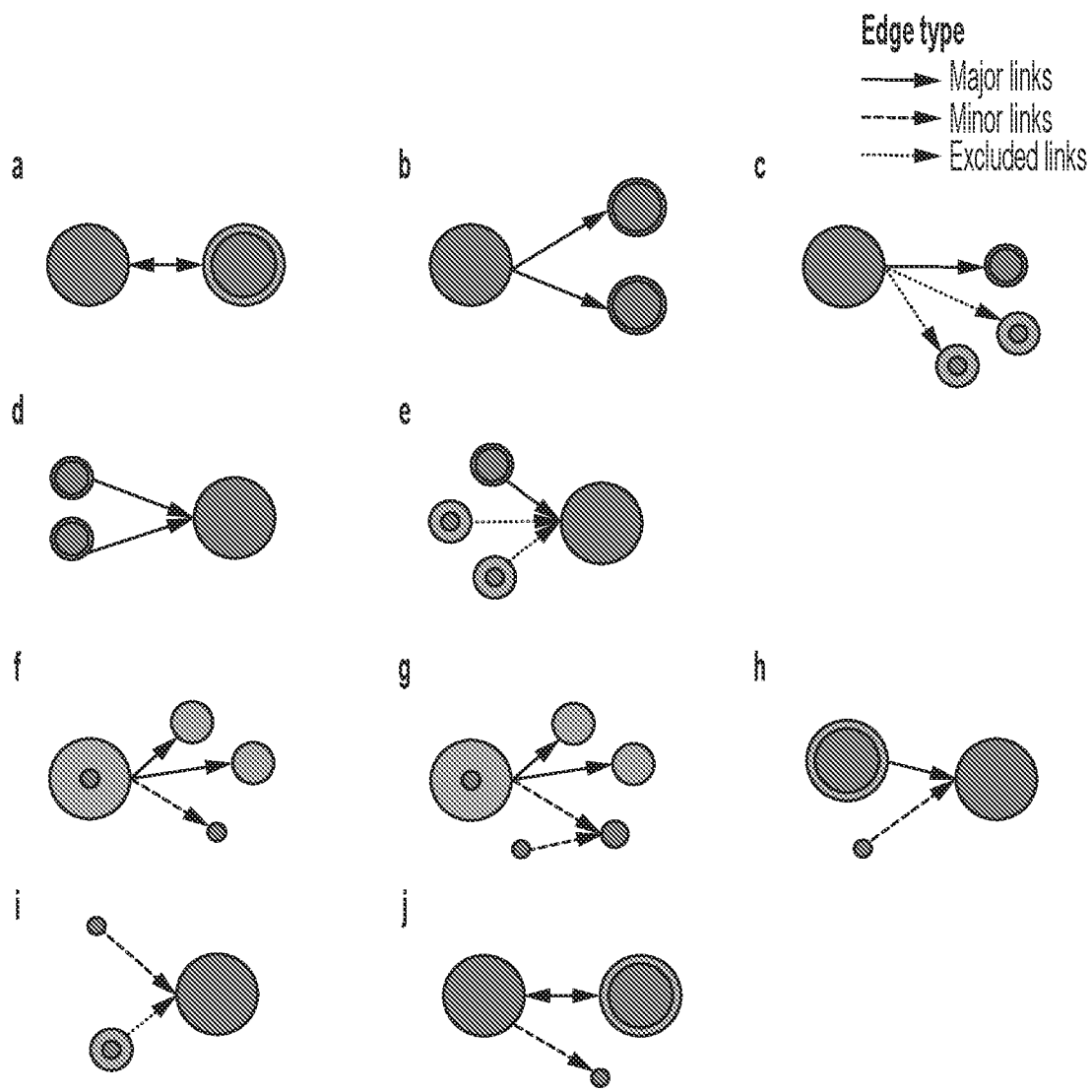
FIGS. 3a-3j illustrate schematic representations of links in trajectories, in accordance with embodiments of the disclosure.

Graphical depictions of the above provided link descriptions are provided in FIGS. 3a-3j. As illustrated, the trajectories are generated by connecting clusters in a given year with counterparts in neighboring years. The darker shaded portion of the clusters represents a preserved subset of publications in each cluster from one time period to the next, and the lighter shaded portion is a non-preserved subset of publications in each cluster from one time period to the next. Edge connections between the clusters in various years are also illustrated, where a solid line represents a major link between clusters, a larger dashed line represents a minor link between clusters, and a smaller dashed line represents excluded links between clusters. Regarding links, FIGS. 3a-3e illustrate cluster connections with major links, and FIGS. 3f-3j illustrate cluster connections with minor links. Individual cluster connections are categorized as follows: FIG. 3a illustrates a one-to-one relation between clusters; FIG. 3b illustrates a split from a first year to a next year; FIG. 3c illustrates shedding of a cluster from a first year to a subsequent year; FIG. 3d illustrates a merger of two clusters; FIG. 3e illustrates a merger of many clusters; FIG. 3f illustrates a clean split of a cluster; FIG. 3g illustrates a recombination split of clusters; FIG. 3h illustrates captured clusters; FIG. 3i illustrates a minor merger of clusters; and FIG. 3j illustrates a bud cluster formation.

From year to year, the cluster formations of FIGS. 3a-3j can form a chain of clusters that illustrate the trajectory of a scientific field or technology as it develops over time. FIG.

Figure 4:
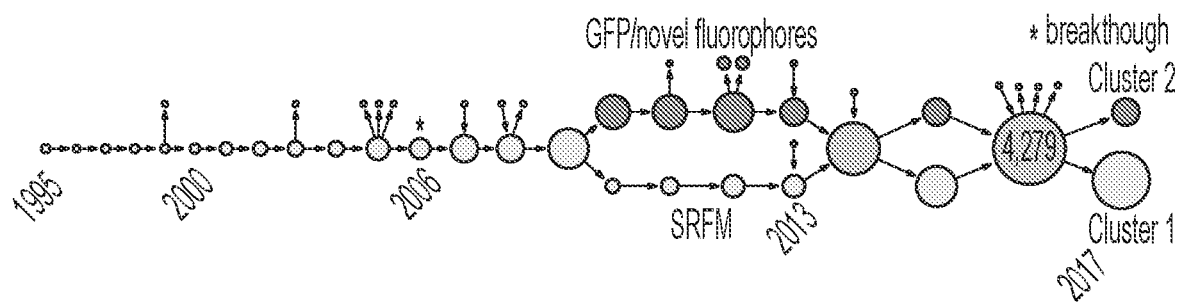
FIG. 4 illustrates a cluster trajectory, in accordance with embodiments of the disclosure.

4 illustrates an exemplary embodiment of this method applied to a particular technology-super-resolution fluorescence microscopy (SRFM). As illustrated in FIG. 4, the SRFM cluster trajectory begins small in the year 1995 and proceeds to eventually gain size in 2005. The SRFM cluster trajectory goes through a split from 2009 to 2010, a subsequent merger from 2013 to 2014, a second split in 2015, followed by another merger in 2016, and a final split in 2017.

Returning to FIG. 1, the above described trajectory calculated at block 130 may be enriched at trajectory enrichment block 132. In the illustrated embodiment, enrichment is accomplished by supplementing the calculated technology trajectory with historical Relative Citation Ratios (RCRs) and Approximate Potential to Translate (APT) scores from block 138. In certain embodiments, word labels, such as word2vec labels, are used to track certain language within citations to map a technology trajectory. By using the RCRs, APT, and other such information, an enhanced understanding of how a topic in question is developing over time may be achieved.

RCR is a measure of a publication's influence. Specifically, it is a field-and time-normalized indicator of a publication's influence, based on the number of times the publication is cited in other publications, relative to publications on the same topic over the normalized time period. The RCRs are calculated by block 140 that receives data from the open citation collection database 108. Block 138 takes the RCRs calculated at block 140 and creates historical RCRs (hRCRs) that are tabulated based on citations in a present year under review and any prior years. As such, the enrichment of the trajectories performed at block 132 uses hRCRs to supplement each level of calculated technology trajectory only for a present year and earlier year in the various trajectory levels. By only using hRCRs for each year level of the trajectory prevents leaking information from future year RCRs in the trajectory.

An APT score provides a prediction that a particular publication will eventually be cited by a clinical trial or clinical guideline (hereafter, clinical article). A higher score means a higher likelihood that the publication under review will be cited in a subsequent clinical article. In certain embodiments, the APT score is calculated by a machine learning algorithm designed for determining APT scores. The specifics of the machine learning algorithm for calculating an APT score are detailed in the following publication: Hutchins, B. I., Davis, M. T., Meseroll, R. A. & Santangelo, G. M. Predicting translational progress in biomedical research. PLOS Biol 17, e3000416, doi: 10.1371/journal.pbio.3000416 (2019), which is incorporated herein by reference.

The machine learning algorithm for determining APT scores is performed by the APT Score ML Model block 142 based on data from the open citation collection 108. Block 142 then provides the APT scores to block 138 that in turn provides the APT scores to the trajectory enrichment block 132 for enriching the calculated technology trajectory. In this manner, publications at each year level of the calculated technology trajectory are enriched with an APT score in order to determine likelihood of that publication being cited by other publications in future years.

By enriching the calculated technology trajectory with hRCRs and APT scores, clusters can be related from year to year to form emerging areas trajectories that show a trajectory for a particular technology cluster based on its historical trajectory over prior years. The emerging areas trajectories are stored at block 134 and may be analyzed by research funders, investors, scientists, and any other such party in order to determine where to direct future efforts and capital.

In addition to detecting emerging areas of science and/or technology, system 100 is further configured to predict transformative breakthroughs. The prediction of transformative breakthroughs is accomplished based on a variety of predictive factors, with four particular factors being of primary relevance.

A first factor is a recent upsurge in a number of publications focused on a particular technical area. This feature is referred to as % New, which represents a percentage of all publications in a CCN cluster that appeared no earlier than year n−1, where n is the year of the CCN cluster.

The second factor represents, for the previous cluster of the same trajectory, the percentage of all publications in year n−1 that appeared no earlier than year n−2. This is referred to as ancestral % New, and by calculating both % New and ancestral % New, a direct measurement of a particular cluster's year-over-year growth can be obtained.

The third factor is a measure of topic cohesion (calculated as normalized entropy). The entropy is a distribution of publications within a CCN cluster among all of its ancestral clusters for each year, normalized by a maximum entropy obtainable within that number of publications. The entropy may be calculated according to techniques in the following publication: Shannon, C. E. A Mathematical Theory of Communication. Bell System Technical Journal 27, 379-423, doi:doi:10.1002/j. 1538-7305.1948.tb01338.x (1948), the disclosure of which is incorporated herein by reference.

The fourth factor is an occurrence of highly influential publications, as measured by RCR growth within a CCN cluster. In a certain embodiment, the signal may be a fraction of a CCN cluster's papers in each prior year (those with a minimum of 1.0 RCR) increasing at least three-fold (minimum of 3.0 RCR) by the year of the cluster.

Using these four predictive factors, system 100 generates a prediction of a particular technical area predicted for a transformative breakthrough. The following describes functions performed by system 100 in order to make these predictions.

Returning to block 128, the CCN data for all clusters in each year is further provided to cluster enrichment block 144. The enrichment block 144 receives input from Other Cluster Properties block 136, from the historical RCRs and APT Scores block 138, and the chronologically organized CCN data from block 128. The data from Other Cluster Properties block 136, the Historical RCRs and APT Scores block 138, and the four factors calculated as described above, thus enrich each CCN cluster; these enrichments provide both additional information about each cluster, and the four factors predictive of transformative breakthroughs to block 144.

Using the historical data of the four above discussed factors predictive of a breakthrough for other CCNs, the hRCRs and APT scores, system 100 is able to perform a comparative analysis against the chronologically organized CCN data from block 128 to predict whether that CCN data is indicative of an upcoming transformative breakthrough. Specifically, the enriched CCN data is provided to block 146 for applying a breakthroughs logistic regression model. The breakthroughs logistic regression model distinguishes emerging areas of technology from those that are not emerging by applying logistic regression as a tool. The breakthroughs logistic regression model functions by fitting a sigmoid, or "logit" curve, to each independent variable (the above described four factors predictive of a transformative breakthrough) and combines them to model a probability that CCN data from block 128 when analyzed against data provided during enrichment at cluster enrichment block 144 will include signals of impending transformative breakthrough in the particular technology area.

Specifically, enrichment block 144 combines the above factors describing each cluster in a trajectory to create a vector that can be used in a logistic regression. This is accomplished by merging factors of each cluster from block 136 with a mean and standard deviation of a trajectory from the five preceding years. This process generates a hysteretic variable for each cluster, which in a particular embodiment provides a 12-number array that combines a status of the four above discussed factors with a status of the five preceding clusters in the corresponding trajectory (the clusters in years x−2 through x−6). In this manner, the Breakthrough Logistic Regression Model block 146 is able to attain a relationship between the four factors of the current CCN data from block 128 and previous historical data in order to predict whether the current CCN data from block 128 contains signals predictive of a transformative breakthrough. If particular CCN data being analyzed does contain signals predictive of a transformative breakthrough, then that CCN data is stored at block 148.

Figure 5:
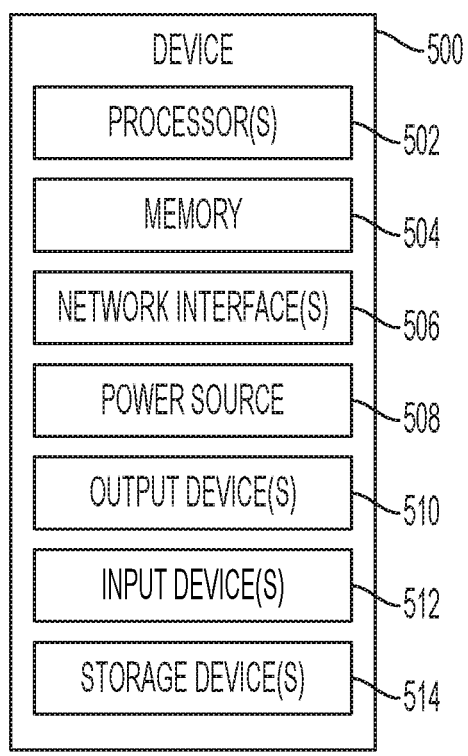
FIG. 5 illustrates a computer system, in accordance with embodiments of the disclosure.

FIG. 5 illustrates a block diagram of a computer system 500 configured for performing the method of organizing technical publication data to determine emerging technical trajectories and identify signals of technological breakthroughs discussed above. Such a computer system may be any hardware device capable of performing the analytic methods discussed herein. For instance, this may include a computer, both desktop and laptop computers, a server, or any other such capable device. With respect to embodiments where the computer system 500 is a server, the server may include a plurality of server devices functioning together in a cloud environment.

As illustrated, computer system 500 may include one or more processors 502, memory 504, network interfaces 506, power source 508, output devices 510, input devices 512, and storage devices 514. Although not explicitly shown in FIG. 5, each component provided is interconnected physically, communicatively, and/or operatively for inter-component communications in order to realize functionality ascribed to the various entities identified in FIG. 1 and referenced in FIGS. 2-4. To simplify the discussion, the singular form will be used for all components identified in FIG. 5 when appropriate, but the use of the singular does not limit the discussion to only one of each component. For example, multiple processors may implement functionality attributed to processor 502.

Processor 502 is configured to implement functions and/or process instructions for execution within computer system 500. For example, processor 502 executes instructions stored in memory 504 or instructions stored on a storage device 514. In certain embodiments, instructions stored on storage device 514 are transferred to memory 504 for execution at processor 502. Memory 504, which may be a non-transient, computer-readable storage medium, is configured to store information within computer system 500 during operation. In some embodiments, memory 504 includes a temporary memory that does not retain information stored when the computer system 500 is turned off. Examples of such temporary memory include volatile memories such as random access memories (RAM), dynamic random access memories (DRAM), and static random access memories (SRAM). Memory 504 also maintains program instructions for execution by the processor 502 and serves as a conduit for other storage devices (internal or external) coupled to device 500 to gain access to processor 502.

Storage device 514 includes one or more non-transient computer-readable storage media. Storage device 514 is provided to store larger amounts of information than memory 504, and in some instances, configured for long-term storage of information. In some embodiments, the storage device 514 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 506 are used to communicate with external devices and/or servers. The computer system 500 may comprise multiple network interfaces 506 to facilitate communication via multiple types of networks. Network interfaces 506 may comprise network interface cards, such as Ethernet cards, optical transceivers, radio frequency transceivers, or any other type of device that can send and receive information. Non-limiting examples of network interfaces 506 include radios compatible with several Wi-Fi standards, 3G, 4G, Long-Term Evolution (LTE), Bluetooth®, etc.

Power source 508 provides power to computer system 500. For example, computer system 500 may be battery powered through rechargeable or non-rechargeable batteries utilizing nickel-cadmium or other suitable material. Power source 508 may include a regulator for regulating power from the power grid in the case of a device plugged into a wall outlet, and in some devices, power source 508 may utilize energy scavenging of ubiquitous radio frequency (RF) signals to provide power to device 500.

Computer system 500 may also be equipped with one or more output devices 510. Output device 510 is configured to provide output to a user using tactile, audio, and/or video information. Examples of output device 510 may include a display (cathode ray tube (CRT) display, liquid crystal display (LCD) display, LCD/light emitting diode (LED) display, organic LED display, etc.), a sound card, a video graphics adapter card, speakers, magnetic, or any other type of device that may generate an output intelligible to a user.

Computer system 500 is equipped with one or more input devices 512. Input devices 512 are configured to receive input from a user or the environment where computer system 500 resides. In certain instances, input devices 512 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

The hardware components described for computer system 500 are functionally and communicatively coupled to achieve certain behaviors. In some embodiments, these behaviors are controlled by software running on an operating system of computer system 500.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for organizing scientific and technological publication data for performing predictive analysis, the system comprising:
    a processor; and
    a memory storing instructions that, when executed by the processor, configure the system to perform steps comprising:
    receiving the publication data from a publication database;
    parsing the publication data to obtain citations and associated citation data for each publication;
    storing the citation data in a first database;
    identifying one or more co-citations between publications in the citation data to obtain co-citation information between publications; and
    storing the co-citation information between publications in a second database;
    projecting a historical view of the co-citation information between publications in the second database to obtain historical co-citation information;
    computing a co-citation vector for each publication from the historical co-citation information to obtain vector data structures describing a number of times a publication is co-cited together with another publication as a value of a component of the vector data structure;
    performing a first order cosine similarity calculation on the vector data structures to obtain cosine similarity data for publications that are co-cited together;
    comparing the cosine similarity data against a similarity threshold, wherein cosine similarity data greater than the similarity threshold is used to create a co-citation graph and retained as input to a Regularized Markov Cluster (RMCL) algorithm configured to perform RMCL parsing;
    applying the RMCL algorithm to the co-citation graph defined by edges that surpass the similarity threshold to determine/map high betweenness edges that parse the co-citation graph into separate topic clusters; and
    collecting features of the topic clusters, including unique identifiers of publications included in each topic cluster, wherein a co-citation network is based on application of the RMCL algorithm to the co-citation graph to create topic clusters that include publications and citations through a latest year selected for inclusion of publication and citation data that is defined as a year of the topic cluster; and
        wherein the memory stores further instructions that when executed by the processor configure the system to perform steps further comprising:
        identifying for each topic cluster of year x, two additional topic clusters, one from topic cluster year x−1, and one from topic cluster year x+1, based on a highest percentage of overlapping publications between the year x and the year x−1, and separately between the year x and the year x+1, across all publication years within each of those topic clusters; and
        assembling those overlapping topic clusters into chronological trajectories based upon connections established between each topic cluster in the year x and each corresponding topic cluster in years x−1 and x+1.

2. The system of claim 1, wherein the memory stores further instructions that when executed by the processor configure the system to perform steps further comprising:
    enriching the chronological trajectory of topic clusters arranged over time with historical Relative Citation Ratios (RCRs) and Approximate Potential to Translate (APT) scores.

3. The system of claim 1, wherein the memory stores further instructions that when executed by the processor configure the system to perform steps further comprising:
    enriching the topic cluster from an individual year with historical cluster data including factors predictive of a technological breakthrough;
    applying a logistic regression model with respect to the factors predictive of the technological breakthrough; and
    predicting whether each topic cluster identified by the RMCL parsing of the co-citation network is likely to produce a scientific breakthrough or the technological breakthrough.

4. The system of claim 3, wherein the factors predictive of the technological breakthrough comprise:
    a % New factor indicating a percentage of all publications within each topic cluster that appeared no earlier than one year prior to the year x of that topic cluster;
    an ancestral % New factor indicating a percentage of all publications in topic cluster x−1 that appeared no earlier than one year prior to the year x−1 of that topic cluster;
    a normalized entropy factor providing a distribution of publications within the topic cluster relative to a collection of control topic clusters with a similar number of publications; and an occurrence of highly influential publications within the topic cluster, as measured by historical Relative Citation Ratio (RCR) values.

5. The system of claim 4, wherein the occurrence of highly influential publications within the topic cluster is determined based on historical RCRs and Approximate Potential to Translate (APT) scores.

6. A method for organizing publication data for performing predictive analysis, the method comprising:
receiving the publication data from a publication database;
parsing the publication data to obtain citations and associated citation data for each publication;
storing the citation data in a first database;
identifying one or more co-citations between publications in the citation data to obtain co-citation information between publications;
storing the co-citation information between publications in a second database;
projecting a historical view of the co-citation information between publications in the second database to obtain historical co-citation information;
computing a co-citation vector for each publication from the historical co-citation information to obtain vector data structures describing a number of times a publication is co-cited together with another publication as a value of a component of the vector data structure;
performing a first order cosine similarity calculation on the vector data structures to obtain cosine similarity data for publications that are co-cited together;
comparing the cosine similarity data against a similarity threshold, wherein cosine similarity data greater than the similarity threshold is retained as input to a Regularized Markov Cluster (RMCL) algorithm configured to perform RMCL parsing;
applying the RMCL algorithm to a co-citation graph defined by edges that surpass the similarity threshold to determine/map high betweenness edges that parse the co-citation information into separate topic clusters; and
collecting features of the topic clusters, including unique identifiers of the publications included in each topic cluster, wherein a co-citation network is based on publications from an individual year, and
wherein the method further comprises:
identifying, for each topic cluster of year x, two additional topic clusters, one from topic cluster year x−1, and one from topic cluster year x+1, based on a highest percentage of overlapping publications between the year x and the year x−1, and separately between the year x and the year x+1, across all publication years within each of those topic clusters; and
assembling the overlapping topic clusters into chronological trajectories based upon connections established between each topic cluster in the year x and each corresponding topic cluster in the year x−1 and the year x+1.

7. The method of claim 6, further comprising:
enriching the chronological trajectory of topic clusters arranged over time with historical Relative Citation Ratios (RCRs) and Approximate Potential to Translate (APT) scores.

8. The method of claim 6, further comprising:
enriching the topic cluster from the individual year with historical cluster data including factors predictive of a technological breakthrough;
applying a logistic regression model with respect to the factors predictive of the technological breakthrough; and
predicting whether each topic cluster identified by the RMCL parsing of the co-citation network is likely to produce a scientific breakthrough or the technological breakthrough.

9. The method of claim 8, wherein the factors predictive of the technological breakthrough comprise:
a % New factor indicating a percentage of all publications within each topic cluster that appeared no earlier than one year prior to year x of that topic cluster;
an ancestral % New factor indicating a percentage of all publications in topic cluster x−1 that appeared no earlier than one year prior to year x−1 of that topic cluster;
a normalized entropy factor providing a distribution of publications within the topic cluster relative to a collection of control topic clusters with a similar number of publications; and
an occurrence of highly influential publications within the topic cluster, as measured by historical Relative Citation Ratio (RCR) values.

10. The method of claim 9, wherein the occurrence of highly influential publications within the topic cluster is determined based on historical RCRs and Approximate Potential to Translate (APT) scores.

11. A non-transitory computer readable medium storing instructions for organizing technical publication data for performing predictive analysis, wherein when a computer executes the instructions, the computer is configured to perform steps comprising:
receiving the publication data from a publication database;
parsing the publication data to obtain citations and associated citation data for each publication;
storing the citation data in a first database;
identifying co-citations between publications in the citation data to obtain co-citation information between publications;
storing the co-citation information between publications in a second database;
projecting a historical view of the co-citation information between publications in the second database to obtain historical co-citation information;
computing a co-citation vector for each publication from the historical co-citation information to obtain vector data structures describing a number of times a publication is co-cited together with another publication as a value of a component of the vector data structure;
performing a first order cosine similarity on the vector data structures to obtain cosine similarity data;
comparing the cosine similarity data against a similarity threshold, wherein cosine similarity data greater than the similarity threshold is retained as input to a Regularized Markov Cluster (RMCL) algorithm configured to perform RMCL parsing;
applying the RMCL algorithm to the citation graph defined by edges that surpass the similarity threshold to determine/map high betweenness edges between a topic cluster and other topic clusters; and
collecting features of the topic cluster, including unique identifiers of the publications included in each topic cluster, wherein a co-citation network is based on publications from an individual year, and wherein the instructions cause the computer to perform steps further comprising:

identifying, for each topic cluster of year x, two additional topic clusters, one from topic cluster year x−1, and one from topic cluster year x+1, based on a highest percentage of overlapping publications between the year x and the year x−1, and separately between the year x and the year x+1, across all publication years within each of those topic clusters; and assembling the overlapping topic clusters into chronological trajectories based upon connections established between each topic cluster in the year x and each corresponding topic cluster in the year x−1 and the year x+1.

12. The non-transitory computer readable medium of claim 11, wherein the instructions cause the computer to perform steps further comprising:

enriching the chronological trajectory of topic clusters arranged over time with historical Relative Citation Ratios (RCRs) and Approximate Potential to Translate (APT) scores.

13. The non-transitory computer readable medium of claim 11, wherein the instructions cause the computer to perform steps further comprising:

enriching the topic cluster from the individual year with historical cluster data including factors predictive of a technological breakthrough;

applying a logistic regression model with respect to the factors predictive of the technological breakthrough; and predicting whether each topic cluster identified by the RMCL parsing of the co-citation network is likely to produce a scientific breakthrough or the technological breakthrough.

14. The non-transitory computer readable medium of claim 13, wherein the factors predictive of the technological breakthrough comprise:

a % New factor indicating a percentage of all publications within each topic cluster that appeared no earlier than one year prior to year x of that topic cluster;

an ancestral % New factor indicating a percentage of all publications in topic cluster x−1 that appeared no earlier than one year prior to year x−1 of that topic cluster;

a normalized entropy factor providing a distribution of publications within the topic cluster relative to a collection of control topic clusters with a similar number of publications; and an occurrence of highly influential publications within the topic cluster, as measured by historical Relative Citation Ratio (RCR) values.

* * * * *